US011759701B2

(12) United States Patent
Bradley et al.

(10) Patent No.: US 11,759,701 B2
(45) Date of Patent: Sep. 19, 2023

(54) SYSTEM AND METHOD FOR GENERATING USER INPUTS FOR A VIDEO GAME

(71) Applicant: Sony Interactive Entertainment Inc., Tokyo (JP)

(72) Inventors: Timothy Edward Bradley, London (GB); David Erwan Damien Uberti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 432 days.

(21) Appl. No.: 16/929,448

(22) Filed: Jul. 15, 2020

(65) Prior Publication Data

US 2021/0031110 A1   Feb. 4, 2021

(30) Foreign Application Priority Data

Aug. 1, 2019   (GB) ...................................... 1910975

(51) Int. Cl.
*A63F 13/213* (2014.01)
*A63F 13/428* (2014.01)
(Continued)

(52) U.S. Cl.
CPC .......... *A63F 13/213* (2014.09); *A63F 13/428* (2014.09); *A63F 13/533* (2014.09);
(Continued)

(58) Field of Classification Search
CPC .................. A63F 13/655; A63F 13/428; A63F 2300/6045; A63F 2300/695; A63F 13/20;
(Continued)

(56) References Cited

U.S. PATENT DOCUMENTS

| 7,042,440 B2 * | 5/2006 | Pryor | ...................... G06F 3/017 |
| | | | 345/158 |
| 9,089,775 B1 * | 7/2015 | Daniel | .................... A63F 13/65 |

(Continued)

FOREIGN PATENT DOCUMENTS

| EP | 1176559 A2 | 1/2002 |
| GB | 2474536 A | 4/2011 |
| JP | 2002083306 A | 3/2002 |

OTHER PUBLICATIONS

Combined Search and Examination Report for corresponding GB Application No. GB1910975.0, 8 pages, dated Jan. 24, 2020.

*Primary Examiner* — Chase E Leichliter
(74) *Attorney, Agent, or Firm* — Matthew B. Dernier, Esq.

(57) ABSTRACT

A system for generating video game inputs is provided. The system comprises an input unit operable to obtain images of a passive non-luminous object being held by a user as a video games controller. The system also comprises an object detector and object pose detector for detecting the object and its respective pose in the obtained images. The pose detector is configured to detect the pose of the object based on at least one of a (i) contour detection operation and (ii) the output of a machine learning model that has been trained to detect the poses of passive non-luminous objects in images. A user input generator is configured to generate user inputs based on the detected changes in pose of the passive non-luminous object and to transmit these to a video game unit at which a video game is being executed. A corresponding method is also provided.

18 Claims, 9 Drawing Sheets

(51) Int. Cl.

| | | |
|---|---|---|
| *A63F 13/533* | (2014.01) | |
| *A63F 13/655* | (2014.01) | |
| *G06T 7/66* | (2017.01) | |
| *G06T 7/73* | (2017.01) | |
| *G06T 7/90* | (2017.01) | |
| *G06N 20/00* | (2019.01) | |
| *G06F 3/0346* | (2013.01) | |
| *G06T 11/00* | (2006.01) | |
| *G06F 18/24* | (2023.01) | |
| *G06F 18/214* | (2023.01) | |
| *G06V 10/56* | (2022.01) | |
| *G06V 10/764* | (2022.01) | |
| *G06V 10/82* | (2022.01) | |
| *G06V 20/20* | (2022.01) | |

(52) U.S. Cl.
CPC ......... *A63F 13/655* (2014.09); *G06F 3/0346* (2013.01); *G06F 18/214* (2023.01); *G06F 18/24* (2023.01); *G06N 20/00* (2019.01); *G06T 7/66* (2017.01); *G06T 7/73* (2017.01); *G06T 7/90* (2017.01); *G06T 11/00* (2013.01); *G06V 10/56* (2022.01); *G06V 10/764* (2022.01); *G06V 10/82* (2022.01); *G06V 20/20* (2022.01); *A63F 2300/308* (2013.01); *A63F 2300/6045* (2013.01); *A63F 2300/695* (2013.01); *G06T 2207/20081* (2013.01)

(58) Field of Classification Search
CPC ........ A63F 13/213; A63F 13/40; A63F 13/60; G06N 20/00; G06F 3/0346
See application file for complete search history.

(56) References Cited

U.S. PATENT DOCUMENTS

| | | | | |
|---|---|---|---|---|
| 9,821,224 | B2* | 11/2017 | Latta | A63F 13/213 |
| 10,281,987 | B1* | 5/2019 | Yang | G06F 3/011 |
| 10,353,532 | B1* | 7/2019 | Holz | G06F 3/04815 |
| 10,429,923 | B1* | 10/2019 | Johnston | G02B 27/0176 |
| 10,579,869 | B1* | 3/2020 | Xiong | G06V 40/107 |
| 10,607,413 | B1* | 3/2020 | Marcolina | G06F 3/012 |
| 10,933,316 | B1* | 3/2021 | Scholler | A63F 13/803 |
| 2007/0155502 | A1* | 7/2007 | Wu | A63F 13/213 463/37 |
| 2008/0211771 | A1* | 9/2008 | Richardson | A63F 13/10 345/158 |
| 2008/0318684 | A1* | 12/2008 | Rofougaran | G06F 3/011 342/450 |
| 2009/0158220 | A1* | 6/2009 | Zalewski | A63F 13/812 382/103 |
| 2010/0150404 | A1* | 6/2010 | Marks | A63F 13/211 348/136 |
| 2010/0241998 | A1* | 9/2010 | Latta | G06F 3/011 715/862 |
| 2010/0302247 | A1* | 12/2010 | Perez | G06V 20/64 382/103 |
| 2011/0125362 | A1* | 5/2011 | Matsunaga | B60W 50/10 701/31.4 |
| 2012/0157198 | A1* | 6/2012 | Latta | A63F 13/57 463/31 |
| 2012/0188237 | A1* | 7/2012 | Han | A63F 13/213 345/419 |
| 2012/0306924 | A1* | 12/2012 | Willoughby | A63F 13/45 345/641 |
| 2013/0072297 | A1* | 3/2013 | Seegers | A63F 13/213 463/31 |
| 2013/0326376 | A1* | 12/2013 | Stachniak | G06F 3/04883 715/762 |
| 2014/0104274 | A1* | 4/2014 | Hilliges | G06F 3/017 345/424 |
| 2015/0363996 | A1* | 12/2015 | Keilwert | G07F 17/3209 463/31 |
| 2016/0175715 | A1* | 6/2016 | Ye | A63F 13/58 715/757 |
| 2017/0336941 | A1* | 11/2017 | Gribetz | G06T 19/20 |
| 2018/0157398 | A1* | 6/2018 | Kaehler | G06F 3/04815 |
| 2019/0096087 | A1* | 3/2019 | Murphy | A63F 13/525 |
| 2019/0122436 | A1* | 4/2019 | Bashkirov | G06F 3/011 |
| 2019/0258320 | A1* | 8/2019 | Yang | G06F 3/0426 |
| 2019/0391724 | A1* | 12/2019 | Holz | G06T 19/006 |
| 2020/0086208 | A1* | 3/2020 | Chapman | H04N 23/90 |
| 2020/0312003 | A1* | 10/2020 | Borovikov | A63F 13/213 |
| 2021/0031110 | A1* | 2/2021 | Bradley | A63F 13/533 |

* cited by examiner

SYSTEM AND METHOD FOR GENERATING USER INPUTS FOR A VIDEO GAME

TECHNICAL FIELD

The present disclosure relates to a method and system for generating user inputs for a video game.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Currently, there exist a number of video game peripherals on the market. These range from e.g. head-mountable displays (HMDs), motion controllers, handheld games controllers (e.g. the DualShock™ 4), steering wheels, gun peripherals, balance boards, etc. Whilst peripherals such as these can enrich a player's video game experience, the technical complexity (and therefore cost) associated with such devices can often act as a barrier to entry in terms of players accessing such equipment. Most video game consoles come with at least one controller and for some players, this may be the only controller in their possession. As will be appreciated, a limited number of peripherals may limit a player's ability to access all of a video game's features (e.g. multiplayer, VR, etc.). Even if a player is in possession of multiple peripherals, each of these may need to be charged regularly in order to be usable.

Most video games allow players to provide player inputs by one or more of: pressing physical buttons on a games controller, performing motion with a motion controller, or making gestures with their limbs. For motion controllers, these typically include either light sources or motion sensors (such as e.g. gyroscopes, accelerometers) which enable the position of the motion controller to be tracked during playing of the video game. The PS Move™ controller is an example of a motion controller, which includes a light source at its upper end for tracking by a video camera. As will be appreciated, motion controllers such as these may not be accessible to all, or usable at all times.

It would be desirable if a user could use an inexpensive, simple and non-electronic device as a video game peripheral. The present disclosure seeks to address or at least alleviate some of the above-identified problems.

SUMMARY

The present disclosure is defined by the appended claims.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

A system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
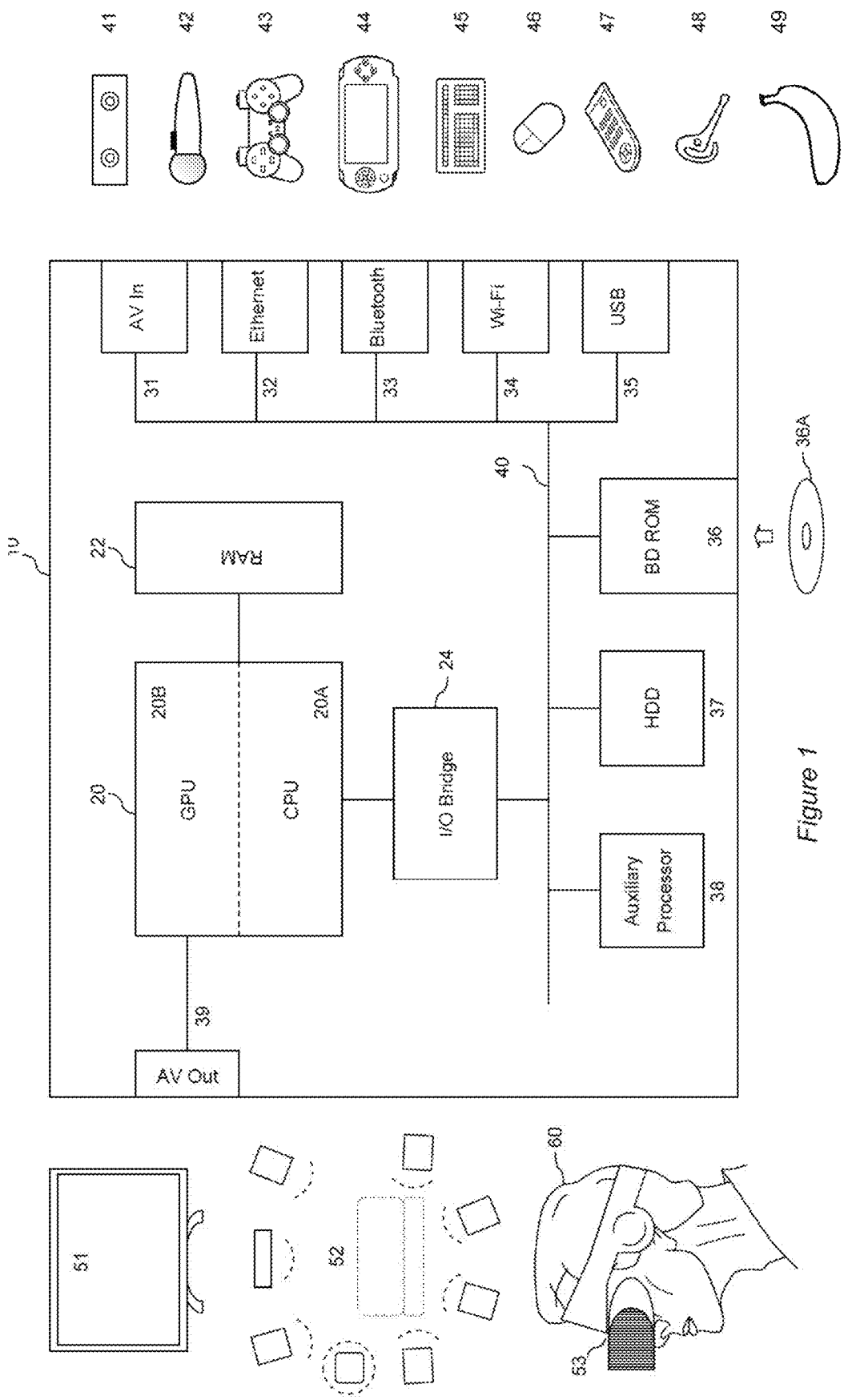
FIG. 1 shows schematically an example of a video game playing device.

FIG. 1 illustrates schematically an example if a video game playing device. FIG. 1 schematically illustrates the overall system architecture of a Sony® PlayStation 4® entertainment device It will be appreciated that the device shown in FIG. 1 is just an illustrative example, and that in some embodiments, the entertainment device may include a next generation console, such as a Sony® PlayStation 5® device.

A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. 25 The APU 20 has access to a random access memory (RAM) unit 22. The APU 20 communicates with a bus 40, optionally via an I/O bridge 24, which may be a discrete component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, 5 or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable 10 entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a microphone, speakers, mobile phone, printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two.

The video game playing device illustrated schematically in FIG. 1 is an example of a video game playing device that may be used in accordance with the present disclosure. In FIG. 1, an additional peripheral device, in the form of a banana 49, is also shown. The ways in which such an object may be used as a controller will be apparent from the embodiments described below.

As mentioned previously, motion controllers are one means through which a player may provide an input to a video game playing device. Typically, motion controllers incorporate an internal sensor (e.g. gyroscope, accelerometer) or a light source to enable the position of the controller to be tracked. In the former example, the motion controller usually transmits an indication of its position and orientation to a video game playing device, which updates the actions of a virtual character accordingly. In the latter example, the light source is usually tracked by a video camera, which detects the location of the lights in the video images and determines corresponding user inputs based on changes in the locations and/or separation of the light sources, e.g. via constellation tracking. Whilst motion controllers such as these may allow for accurate tracking of a player's movements, a player may find the cost of such devices prohibitive, or that their motion controller has insufficient power and therefore cannot be used immediately. A system for alleviating these problems will now be described in relation to FIG. 2. The video game playing device described in relation to FIG. 1 may correspond to or form part of such a system.

Figure 2:
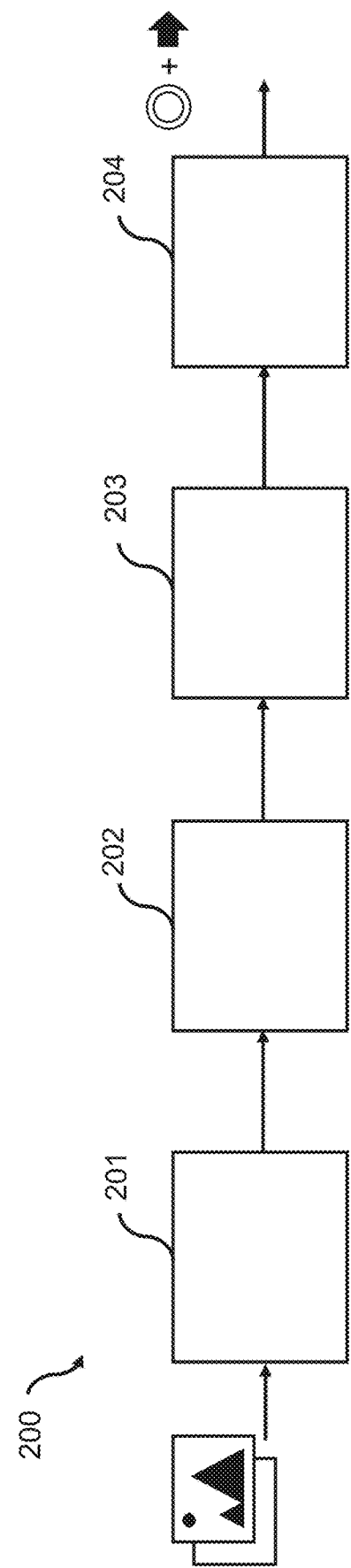
FIG. 2 shows schematically an example of a system for generating video game inputs.

FIG. 2 shows schematically an example of a system 200 for generating user inputs for a video game. The system 200 comprises an input unit 201, object detector 202, object pose detector 203 and user input generator 204. In FIG. 2, images are shown as an input, and video game inputs (in this case, corresponding to button presses) shown as an output.

The input unit 201 is operable to obtain images of a non-luminous passive object being held by a user. The object may correspond to an inanimate object that is being held by a user so as to use the object as a video games controller. The object is said to be non-luminous in the sense that it is not emitting light, or at least not for the purposes of enabling tracking of the object. In some examples, the object may not be capable of producing light, only reflecting light from an external light source. The non-luminous object may correspond to an everyday item such as e.g. a banana, orange, mug, pen, glass, etc. In some examples, the non-luminous object does not comprise any internal positional sensors. In other examples, the object may comprise positional sensors, but these are not used for performing tracking of the position and orientation of the device, at least not for the purposes of generating user inputs for a video game.

The object is said to be passive in that it is not actively generating or emitting data (e.g. light, radio signals, etc.) so as to facilitate tracking of the object. In the present disclosure, references to a 'non-luminous object' will be understood as meaning a passive, non-luminous object as described above.

The input unit 201 may be configured to obtain images of the non-luminous object from a video camera that is arranged to capture images of the user holding the non-luminous object. For example, the input unit 201 may correspond to a communication interface of a video game playing device (such as that described in relation to FIG. 1) that is configured to receive video images of the user from a video camera via a wired or wireless connection. The images may be received via, the AV In 31, Ethernet 32, Bluetooth 33, Wi-Fi 34 and USB 35 ports described previously in relation to FIG. 1, or indeed, any suitable means. The video camera may correspond to e.g. a peripheral device, such as e.g. the PS Camera™. The input unit may comprise e.g. a video buffer that stores video frames received from the video camera, prior to subsequent processing (as described below). Generally, the video images correspond to video images captured of the user in real or near-real time, which are subsequently used to control the operation of the video game playing device in real or near-real time (with any delays arising from e.g. the propagation and processing of the images).

Figure 3:
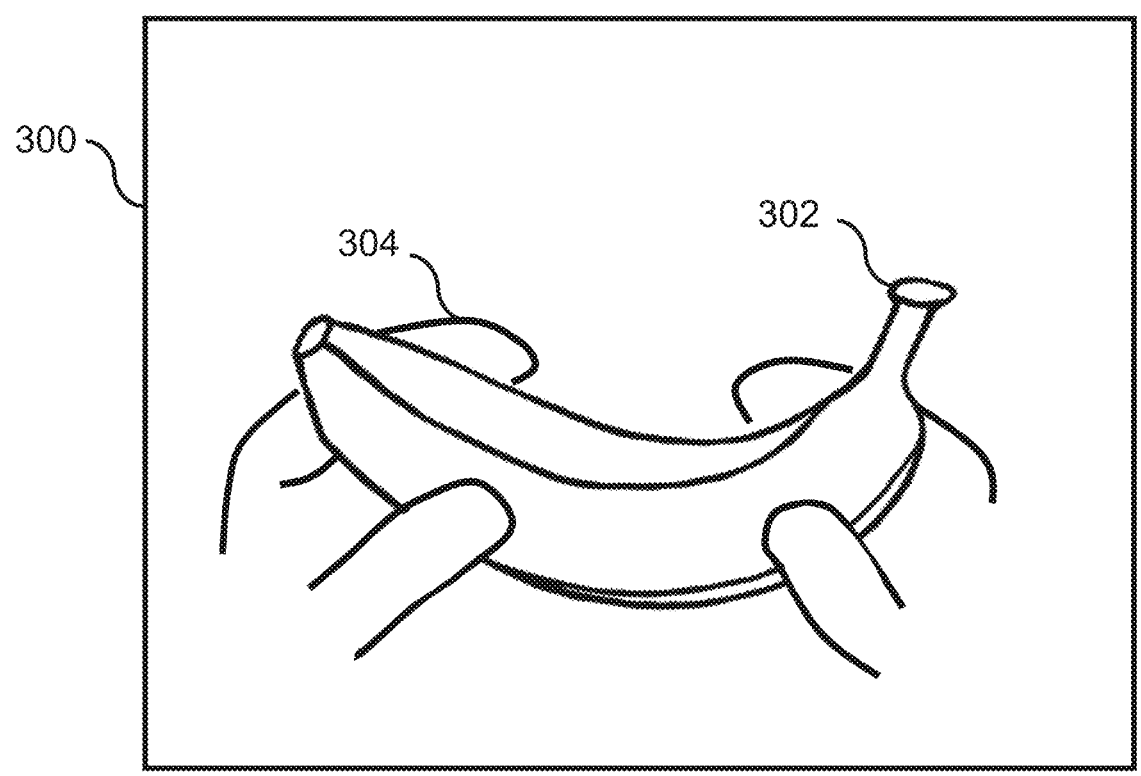
FIG. 3 shows schematically an example of a video image of a banana being used as a video games controller.

FIG. 3 shows schematically an example of a video image 300 in which a user is holding a banana 302 (an example of a non-luminous object) with their hands 304. The video image 300 is an example of an image that may be obtained by (or at) the input unit 201.

Returning to FIG. 2, the input unit 201 is shown as providing an input to the object detector 202. The object detector 202 is configured to detect the non-luminous object in the obtained images. The object detector 202 is configured to detect an area in the image corresponding to the non-luminous object based on the pixels corresponding to the object and not based on a physical identifier that has been added to the object. It is known in the art, for example, that QR code stickers can be added to objects so as to allow those objects to be detected and identified. However, in the present disclosure, it is the pixels in the images corresponding to the object that are identified, e.g. via segmentation.

It will be appreciated that, in some examples, a user may have a non-luminous object in each hand. The generation of video game inputs in such a situation will be discussed later (see section: two object controller).

It is noted that the term "based on" is used throughout the present disclosure. The skilled person will appreciate that this term can imply "in dependence upon", "in response to" and the like, such that data A being based on data B indicates that a change in data B will lead to a resulting change in data A. Data B may be an input to a function that calculates data A based on data B, for example.

In some embodiments, the object detector 202 comprises a cascade classifier that has been trained to detect non-luminous objects in the obtained images. The cascade classifier may be trained with images of non-luminous objects that a user is expected to attempt to use a video games controller. In some cases, it may be that a user is told in advance what objects can be used as a games controller, and these objects may correspond to the objects that the cascade classifier has been trained on. The cascade identifier may be configured to identify the pixels in each obtained image that correspond to the non-luminous object being held by the user. It will be appreciated that any suitably trained machine learning model may be used to detect the non-luminous object in the obtained images. Examples of machine learning models that may be trained for such purposes include Region-Based Convolutional Neural Networks (R-CNNs), Fast R-CNNs, You Only Look Once models (YOLO), etc.

In additional or alternative embodiments, the object detector 202 is configured to detect a contour in the obtained images corresponding to a periphery of the non-luminous object that is being held by the user. The 'findContours( )' function available in OpenCV® may be used for finding such contours in the obtained image. The 'findContours( )' function uses Green's theorem, followed by second and third order image moments to find the contours in a given image. Techniques for identifying contours in images are well known in the art and any suitable technique may be employed by the object detector 202.

In examples where contour detection is used to detect the object in the image, the object detector 202 may be configured to obtain colour information indicating a pre-determined or learned colour of the non-luminous object that the user is holding or intends to hold and to filter out one or more colours not corresponding to the pre-determined colour from the obtained images, prior to performing the contour detection. For example, it may be known in advance that a user intends to use a banana or orange as a video games controller (e.g. by having selected an option such as 'add a banana for player 2 to join'), and so the object detector 202 may be configured to segment out colours not corresponding to yellow or orange from the obtained images. The object detector 202 may be configured to generate a binary mask of each obtained image, following the filtering of any colours known not to correspond to the object being held by the user. The contour detection may then be performed on the binary mask generated for each image.

The object detector 202 may be configured to detect a plurality of contours in the obtained images. For example, it may be that, following a filtering operation, there are a plurality of closed loops in the obtained images (or filtered images), with only some (or one) of these corresponding to the object being held by the user. The object detector 202 may be configured to determine which of the detected contours has the largest area and to identify the largest contour as corresponding to the object being held by the user. It may be sufficient to identify the largest contour as corresponding to the object being held by the user when the user is positioned relatively close to the camera capturing the images, since further objects will generally be associated with smaller contours. Moreover, if the colour filtering operation has been performed, the largest contour may be a reliable indication of the object that is being held by the user.

In some examples, where e.g. a user's hand is positioned over some of the object, the object detector 202 may be configured to identify two contours having the largest area as corresponding to the object being held by the user. This is because the user's hand may interrupt the larger closed loop that would otherwise be formed by the object in absence of the user's hand. As will be appreciated, in some examples, it may be necessary to determine whether the two contours having the largest area are separated by more than a threshold distance, since if they are, this may be indicative that the two contours correspond to two completely different objects, one of which is not being held by the user.

As mentioned previously, the system 200 also comprises an object pose detector 203 operable to detect changes in pose of the non-luminous object based on the obtained images of the object. The object pose detector 203 is configured to detect the pose of the passive non-luminous object in the obtained images based on the obtained images of the object. The object pose detector 203 is configured to detect the pose of the passive non-luminous object based on at least one of (i) a contour detection operation and (ii) the output of a machine learning model that has been trained to detect the poses of passive non-luminous objects in images. In the embodiments described herein, the two forms of a pose detection are generally described separately, although it will be appreciated that these may be used in combination. For example the object detector may use contour detection to detect the object in an obtained image, with the detected contour being input to a suitably trained machine learning model.

In some examples, it may be that both the object detection and/or object pose detection is performed exclusively using contour detection or a suitably trained machine learning model.

In embodiments involving contour detection, the pose detector 203 may be configured to detect changes in pose of the non-luminous object based on changes in at least one of the orientation, position and area of the contour in the obtained images, relative to a default orientation, position and area of the contour. For example, the user may hold the banana in the pose that they intend to use it for e.g. 1 s, with changes in orientation, position and area of the contour being detected relative to this initial pose.

In these embodiments (i.e. involving contour detection), the object pose detector 203 may be configured to generate a linear representation of the object. For example, if the object corresponds to a banana, the object pose detector 203 may be configured to fit a line to the contour corresponding to a line along the length of the banana. This line may be fitted by taking e.g. the average (x,y) coordinate of the contour for each x-value of the contour having two y-values. The object pose detector 203 may then be configured to detect changes in orientation of the object based on a rotation of the corresponding linear representation of the object, relative to a default orientation of the linear representation of the object.

It will be appreciated that a linear representation of the contour need not be generated in order to detect changes in an area and position of the contour, although the linear representation may still be used for this purpose.

It will be further appreciated that, in embodiments involving contour detection, the video image of the object being held by the user will be a projection of the 3D object into a 2D plane (i.e. the image plane), and so changes in orientation will need to be inferred from changes in appearance of the object in the 2D image. For asymmetric objects, such as bananas, it may be that a direction is defined based on properties of the object. For example, bananas usually have a narrower tip at one end, and so this part of the corresponding contour may be identified as corresponding to e.g. the north/south/east or west direction, with changes in orientation being detected relative to this axis.

In some examples, it may be that a central point of the object is identified using e.g. image moments, and the central point is used to define an origin of a coordinate system. A vector may be defined as extending from the origin of the coordinate system to a given point on the contour (e.g. the banana nib). Rotation of the object in the clockwise and anticlockwise directions (e.g. about the yaw-axis) may then be detected based on rotation of the vector relative to arbitrary pre-defined axes (e.g. x- and y-axes). Generally, it is expected that rotation in the clockwise and anticlockwise rotations will result in greater changes in direction of the corresponding vector, and so can be distinguished from rotation in the pitch and yaw axes. This rotation can then be translated into e.g. steering inputs.

In FIG. 2, the object pose detector 203 is shown as receiving an input from the object detector 202. The input received from the object detector 202 may correspond to the one or more contours identified as corresponding to the object by the object detector 202.

Figure 4:
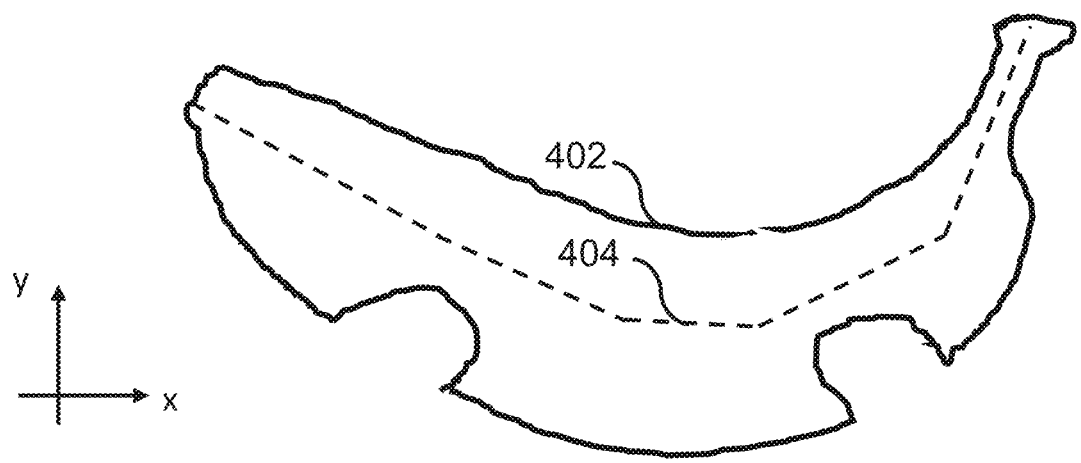
FIG. 4 shows schematically an example of a video image of two oranges being used as a video games controller.

FIG. 4 schematically shows an example of a contour detected for the banana shown in FIG. 3. In FIG. 4, the banana is shown as having contour 402, and a corresponding linear representation 404 indicated by a dashed line. It can be seen in FIG. 4 that at least some of the outline corresponds to where the user's thumbs were when holding the banana. Nonetheless, in FIG. 4, the largest contour still corresponds to the object that is being held, and can therefore be used to detect the object in the image.

Returning to FIG. 2, the system 200 also comprises a user input generator 204 operable to generate a user input based on detected changes in the pose of the non-luminous object. The user input corresponds to a command for processing by an instance of a video game being executed at a video game playing device. The command may be transmitted to e.g. the CPU of a video game playing device, for processing thereat. The video game playing device may then update the display of a virtual character or object in accordance with the input generated by the user input generator 204. Generally, the generated user inputs may be transmitted to a so-called video game unit, which comprises one or more processors (e.g. in the form of a CPU and GPU) for updating the state of a video game in accordance with received player inputs.

In embodiments where contour detection is used to detect and track the object, the user input generator 204 may be configured to generate different respective user inputs based on whether the orientation, position and area of the contour is detected as changing (relative to a default orientation, position and area of the contour) in the obtained images. For example, rotation of the contour (or representation thereof) may be used to generate a directional command corresponding to steering a moving object in a corresponding direction or changing a viewpoint of a virtual camera in a corresponding direction. In some examples, changes in area of the contour may be used to control a rate of travel in the forward and/or backward directions; for example, an increase in area may correspond to a 'travel forward' command, or 'accelerate' command; a decrease in an area may correspond to 'travel backward' command or 'brake' command. Moreover, changes in position of the contour (rather than rotation about an axis) may be used to generate a pause command. For example, movement of the contour above a threshold height, or out of the frame of the obtained images, may correspond to a pause operation.

It will be appreciated that the components of the above-described system 200 may be implemented at one device or distributed across multiple devices. In some examples, the video game playing device may comprise the input unit 201, object detector 202, object pose detector 203 and user input generator 204. That is, the video game playing device may be configured to perform the functions of each component described above (i.e. each component may correspond to a respective module being executed by one or more processors at the video game playing device). In other examples, it may be that the input unit 201, object detector 202 object pose detector 203 and user input generator 204 are split between an intermediate device that is communication with the video game playing device. It will be further appreciated that, in some examples, the system 200 may further comprise a camera for capturing the images of the user holding the non-luminous object.

Two-Object Controller

In some embodiments, a user may wish to use two non-luminous passive objects as a video game controller. The two non-luminous may be of the same type, e.g. a player may hold two bananas—one in each respective hand; or e.g. two oranges—one in each respective hand. The above-described system 200 may be used to convert the movements of two objects being held by the user into video game inputs, as will be described below.

Referring to FIG. 2, the input unit 201 may be configured to obtain images of at least two non-luminous objects being held by the user. Generally, each object will be in a respective hand of the user.

The object detector 202 may be configured to detect two non-luminous objects being by the user in the obtained images. In such examples, the object detector 202 may be configured to provide an input to object pose detector 203 and user input generator 204, so as to indicate that a 'dual object' control mode is to be used for controlling the virtual object or character in the video game. In response to receiving this input, the object pose detector 203 and user input generator 204 may switch to a different (or adjusted) mode of object tracking and user input generation.

In some embodiments, the object detector 202 is configured to detect each object in the obtained image by detecting respective contours corresponding to the at least two non-luminous objects. As described previously, detecting contours of each object may involve filtering colours from the images known not to correspond to the objects being held by the user. As will be appreciated it may be more effective for the objects being held by the user to be the same colour (e.g. two bananas or two oranges), to simplify the filtering operation and subsequent identification of contours corresponding to those objects. As before, it may be that the images are first filtered, a binary mask is generated, and that the contour(s) of each object is detected in each image based on the binary mask generated.

In some examples, the object pose detector 203 may be further configured to detect a location within the image representation of each object being held by the user, in the obtained images. The image representation may correspond to one or more contours detected as representing the object being held. The location may correspond to a generally central point or region with respect to the contour detected for each object.

The object detector may be configured to determine a respective location within the image representations of each object by calculating an image moment for the pixels within the contours detected for each non-luminous object. This may be useful where, for example, the objects are symmetrical, such as oranges, and so the central points or regions (e.g. centre of mass) can be calculated relatively easily. The moments( ) function in OpenCV® is an example of a function that may be used for calculating the image moment of a contour. Generally, an image moment defines a weighted average of the image pixels' intensities (which in this case, is limited to the pixels within the contour) and can be used to determine a centroid associated with an object.

In such examples, the object pose detector 203 may be configured to detect a change in pose of the at least two non-luminous objects based on changes in orientation of a line joining the locations within the image representation of each object (relative to some default orientation). The object detector 202 may be configured to fit a line between the centre points (or regions) identified for each object and to track changes in orientation of the line joining the centre points of each object. The user input generator 204 may be configured to generate a directional input based on changes in the orientation of the line joining the centre points of each object. The line joining the centre-points may be treated in the same way as the linear representation described previously in relation to generating a steering or change in viewpoint command.

More generally, the object pose detector 203 is configured to detect changes in relative pose of each object, so that a corresponding user input can be generated based on the detected changes in pose.

Figure 5:
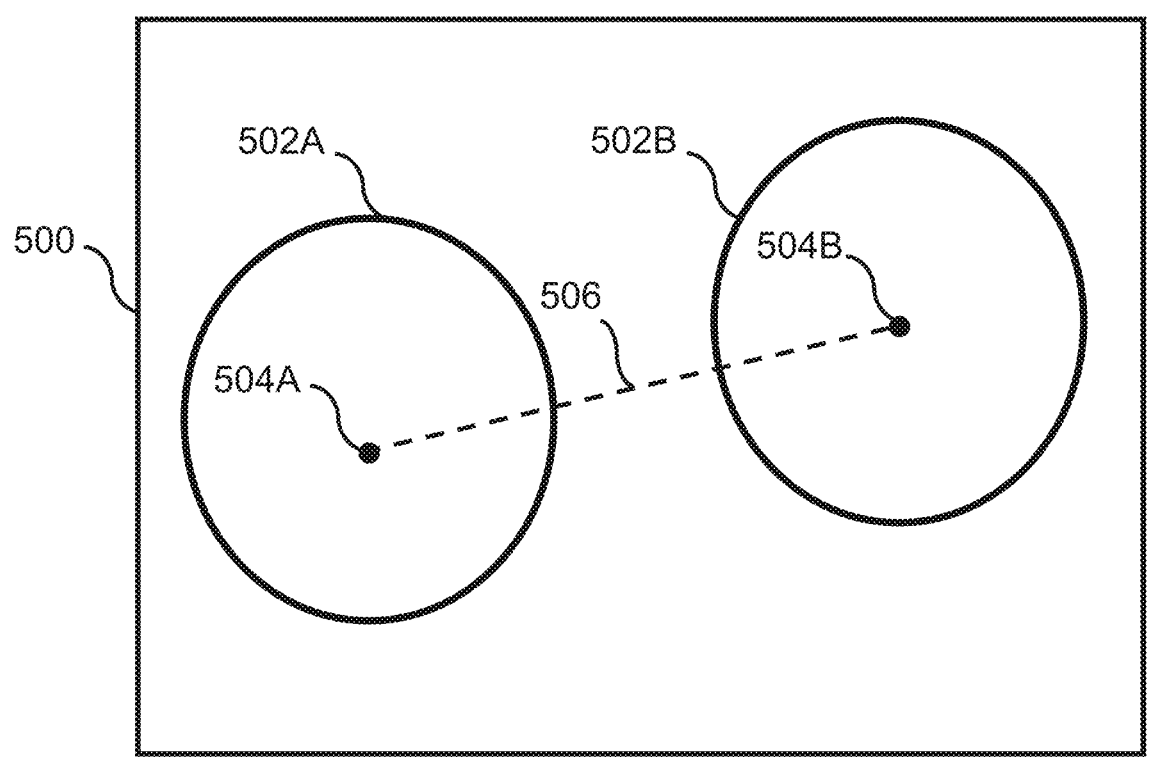
FIG. 5 shows schematically an example of a video image of two oranges being used as a video games controller.

FIG. 5 illustrates schematically an example of a video image 500 in which a user is holding two oranges 502A, 502B as a video games controller. In FIG. 5, oranges 502A and 502B are shown as having respective centre points 504A, 504B. The respective centre points are joined by line 506. The line 506 corresponds to the line that may be tracked in order to generate a directional input to a video game. The video game may correspond to a racing game, for example. For clarity, the user's fingers are not shown in FIG. 5, although it will be appreciated that these will likely be visible and may affect the contour detection as well as any subsequent calculation of the corresponding centre points.

The area of the contours detected for each object and their relative position within the obtained images may be tracked in the same manners as described previously. Similarly, the user input generator 204 may be configured to generate different respective user inputs based on changes in area and position of at least one of the contours associated with the objects. For example, a detected forward movement of the orange in the user's right hand may correspond to an 'accelerate' input, whereas movement of the orange in the user's left and may correspond to a 'brake' input. Alternatively, moving both of the oranges forward or backward may correspond to an accelerate and brake command respectively.

Additionally, movement of one or both of the objects above or below a threshold height may be identified as corresponding to a pause command. For example, if one or both of the objects can no longer be detected in the obtained image, it may be assumed that the player is no longer engaging with the video game. Alternatively, in such a case, it may be that the object pose detector 203 reverts to tracking the single object that can still be detected in the obtained images. The pose-tracking of the single object may be performed as described previously in relation to a single-object controller.

For objects that are asymmetric in at least one axis, such as bananas, it may be more likely that the user's hand interrupts a complete outline of the object. Hence, the object pose detector 203 may be configured to detect at least two contours associated with each object. The object detector 202 may therefore be configured to identify the four largest contours in the obtained images (or filtered images) as corresponding to the objects being held by the user. Again, there may be a prior step of filtering colours not corresponding to the objects from the images and generating a binary mask of the filtered images.

The object detector 202 may be configured to fit a line to each contour (e.g. along its length). The line fitted to each contour may correspond to a linear representation of the contour e.g. a line through the centre of the contour (in x-y). Each object may be associated with two linear representations—e.g. a line for each uninterrupted segment of the object. The object detector 202 may be configured to interpolate between the two linear representations generated for each object, so as to generate a single linear representation for that object.

It will be appreciated that, in some examples, it may be that a single contour is detected for each object, e.g. where the hand does not cover the front face of the banana (relative to the camera capturing the images). In such examples, each object may be associated with a single linear representation.

Figure 6:
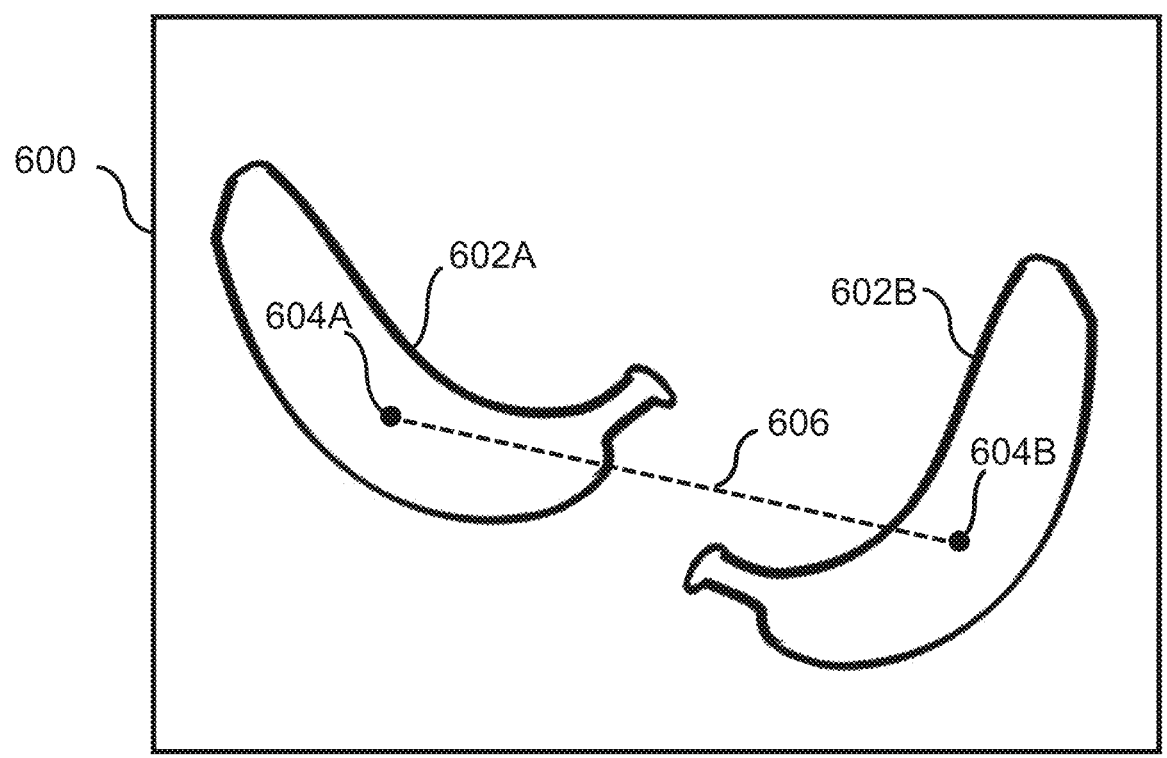
FIG. 6 shows schematically an example of a video image of two bananas being used as a video games controller.

The object pose detector 203 may be configured to detect a change in pose of the objects being held by the user based on a change in orientation of a line intersecting the centres of the linear representations generated for each object. An example of this is shown in FIG. 6, which schematically illustrates a video image 600 of two bananas being used to play a video game. In FIG. 6, the contour of each banana is shown as contours 602A, 602B, having corresponding centre points 604A, 604B, joined by line 606. Rotation of the line 606 joining the centre points 604A, 604B of each linear representation may be provided as an input to the user input generator 204, which generates a corresponding directional input. The directional input may correspond to a steering or change in viewpoint input, as described previously. It will be appreciated that in FIG. 6, the user's fingers are not shown for reasons of clarity.

It will be appreciated that, in embodiments where machine learning is used to detect the objects in the obtained images (e.g. via a cascade classifier), it may not be necessary to perform contour detection on the objects. In such embodiments, contour detection may be implicit from the localization of the object performed by the trained machine learning model. However, in such embodiments, the object detector 202 may still be configured to determine a central point or region for each object, and to detect changes in pose of the two objects relative to one another. This may include e.g. changes in relative separation and angle of the central points for each object. The changes in angle with respect to the two centre points of each object may be tracked by fitting a line between the centre points and tracking a rotation of the fitted line relative to some axis (e.g. the x-axis). It may be useful to use machine learning to perform the object identification, as such methods may be more robust and less reliant on e.g. a filtering operation that requires some prior knowledge of the object being held by the user. Provided that the machine learning model has been trained on a sufficient number of different objects, it should be possible to detect an object being held by the user as a video games controller.

In some embodiments, contour detection may be performed in a deterministic manner (i.e. without the use of machine learning), with the pose of the objects being detected via machine learning. For example, the object detector 202 may be configured to provide the object pose detector 203 with the contour(s) detected for a given object, and the machine learning model may be trained to determine a respective pose of the object based on the contour(s) input to the trained model.

In some embodiments, the object pose detector 203 is configured to detect whether the distance between points representative of the centre of each object is less than a threshold distance. The threshold distance may correspond to the length of one or each object. For example, if the user is holding two bananas, the object pose detector 203 may be configured to detect whether the distance between the centres is less than the length of one (or each) banana. In response to a positive determination, the object pose detector 203 may be configured to provide an input to the user input generator 204, indicating that the distance is less than the threshold distance. In response to receive this input, the user input generator 204 is configured to generate a user input corresponding to a change in control mode. For example, a detection of two bananas being positioned end to end may result in a reverse command being generated.

It will be appreciated that, in some embodiments, a user may hold more than two objects in each hand, and therefore each of these objects and their respective poses will need to be detected. The detection of these objects and their poses may be performed as above with e.g. a greater number of contours and corresponding centre points being detected for each object. The motion of each object relative to the other objects may be used to generate user inputs, wherein each user input may be different depending on which of the objects has been moved, and the nature of the movement.

In some embodiments, the object pose detector 203 may comprise a machine learning model that has been trained to perform six-dimensional pose estimation for each non-luminous object detected by the object detector 202. The machine learning model may comprise a convolutional neural network that has been trained for such purposes. A non-limiting example of such a machine learning model is the 'PoseCNN' model (see: 'PoseCNN: A convolutional neural network for 6D Pose Estimation in Cluttered Scenes', Y. Xiang et al, 26 May 2018, p. 1-10'). In such embodiments, the detected pose of at least one object may used as a higher dimensional controller, with motion in one or more dimensions being used to generate different respective user inputs. For example, rotation in the roll, pitch and yaw axes may each correspond to a different respective user input. Rotation about the roll axis may correspond to steering, while rotation about the yaw axis may correspond to acceleration/deceleration; rotation in about the yaw axis may correspond to e.g. a change in viewpoint. Similarly, translation in the x, y and z axes may each be assigned to different user inputs (the rotation and translation axes provided six dimensions in which the objects can move in).

In examples where a user is detected as holding two objects, the pose detector may be configured to detect the six-dimensional pose of each object in the obtained images. The user input generator 204 may be configured to generate different user inputs based on the changes in pose of one or both objects.

In embodiments where machine learning is used for detecting the pose(s) of the object(s) being held by the user, the object detector 202 may be configured to detect a plurality of keypoints for each non-luminous object being held by the user. The user input generator 204 may be configured to generate a user input based on a detection of the distance between at least some of the keypoints for each object being detected at greater or less than a threshold distance. For example, the object detector 202 may detect that a user is holding a cup, and that a saucer is also visible in the obtained images. In response to detecting the cup as coming into contact with the saucer (based on a detected proximity of corresponding keypoints), the user input generator 204 may generate a 'pause' command that is transmitted to the CPU of the video game playing device.

In some examples, it may be that two different users are each holding one or more non-luminous objects. For example, two users may each be holding a banana in a respective hand. To enable each of these users to participate in a multiplayer video game session, the system may further comprise a user identification unit operable to associate each non-luminous object with a different respective user. The user identification unit may be configured to associate a given object with a given user based on at least one of a relative (i) distance and (ii) depth associated with the object exceeding a threshold value. It may be for example, that two objects corresponding to bananas are identified in a left and right region of the obtained images, and that the left-most banana is assigned to the first player and the right-most to the second player. The threshold distance and/or depth may be used to distinguish between the case where a single user is holding two objects.

In more complex examples, it may be that the user identification unit is configured to detect the users in the obtained images. In such examples, a given object may be associated to a given player based on the position and/or depth of that object relative to a detected position and/or depth of the corresponding player. For example, a given object may be associated to the player that is detected as being closest to it. As will be appreciated, in order to estimate a depth of the object and player, the obtained images may need to include a depth image, or a stereoscopic image from which a depth image can be estimated. In some cases, it may be known in advance that a user intends to use e.g. a fruit as a controller, and the relative to depth of the player and fruit may be estimated based on the size of the fruit in the obtained images.

The user identification unit may be configured to provide an identifier to the object pose detector 203 indicating which user a given object corresponds to. The object pose detector 203 may provide the identifier to the user input generator 204, such that changes in pose of a given object are used to generate user inputs for the corresponding user.

In some examples, the video game may provide some visual feedback as to the objects that have been detected and assigned to respective users. For example, if the video images of the users holding the objects are displayed at a display, then a visual indication of 'player 1' and 'player 2' may provided at positions corresponding to the respective positions of the players in the images. This may allow users to immediately identify which character or virtual object they are controlling.

The user input generator 204 may be configured to generate inputs for each user participating in the video game session based on the changes in pose of the object identified as corresponding with that user. The detection and tracking of the objects being held by the user may be performed in any of the previously described manners. In some examples, each user may hold more than one object, with the detection and tracking occurring as described previously. The user input generator 204 may be configured to transmit an identifier associated with each detected object (or e.g. object pair) to the CPU of the video game playing device, to ensure that the generated user inputs are interpreted as belong to different users.

Figure 7:
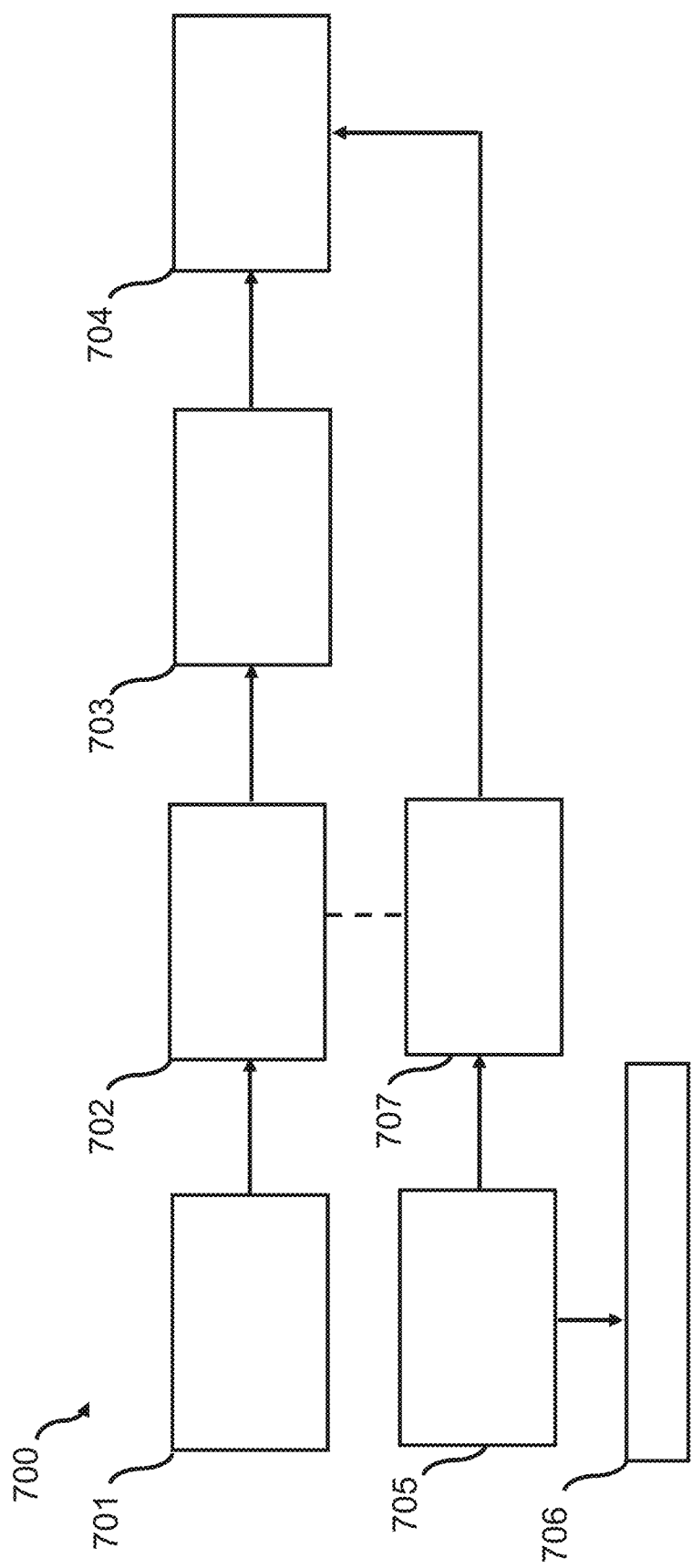
FIG. 7 shows schematically an example of a system for generating an augmented reality image of a non-luminous passive controller.

FIG. 7 schematically illustrates a modified version of the system 700 shown in FIG. 2. In FIG. 7, the system 700 is adapted so as to generate an augmented image of the object or objects being held by the user. The system 700 comprises an input unit 701, object detector 702, object pose detector 703 and user input generator 704; each of these components may operate in the manners described previously.

In FIG. 7, the system 700 further comprises an image generator 705 operable to generate an image of one or more virtual buttons for superimposing on top of a user's view of the non-luminous object. The image generator 705 may be located at e.g. the video game playing device, or a peripheral device such as an HMD.

In FIG. 7, the system 700 also comprises a display 706 for displaying the image of the virtual button at a location that corresponds to a location on the surface of the non-luminous object. The display 706 may correspond to the display of a head-mountable display (HMD), with the image of the virtual button corresponding to an augmented reality image. The HMD may be configured to obtain information indicating a relative position and depth of the object, and to display the image of the virtual button at a location on the display that coincides with a viewable surface of the object. The position and depth of the object relative to the user may be obtained from a camera, such as the camera that captured the images of the user holding the object, for example.

Alternatively, or in addition, the display 706 may correspond to e.g. a TV device that is being used to play the video game, and at which the video image of the user holding the object is visible. In such examples, the image of the virtual button(s) may be displayed at a location in the video image of the user that corresponds to a surface of the object(s) being held by the users. In such examples, the location of the object in the images may be detected as described previously (e.g. via machine learning and/or contour detection), and the images of the virtual buttons displayed at a location that is within the pixel area corresponding to the detected object(s).

In FIG. 7, the system 700 also comprises a finger detector 707 operable to detect a user's finger in the obtained images and a location of the finger relative to the non-luminous object. The finger detector 707 is configured to detect when the location of a user's finger relative to the object coincides with the location of the virtual button. The finger detector 707 is configured to provide an input to the user input generator 704 in response to detecting that a user's finger intersects a (or one of) the virtual buttons. The user input generator 704 is configured to generate a user input in accordance with a pressing of the virtual button. The user input generated in response to the pressing of the virtual button may correspond to a further, additional input that is different from the inputs generated in response to detected movement of the non-luminous object.

The finger detector 707 may be configured to detect the fingers of the user in the obtained images in a similar manner to the detection of the objects themselves. For example, the finger detector 707 may comprise a machine learning model that has been trained to identify both objects and fingers holding those objects in images. Alternatively, or in addition, contour detection may be used to detect the fingers in the obtained images; for example, if a first contour is detected as corresponding to a given object, contours located between or adjacent to that contour, and having a relative size that is comparable to the relative size of fingers, may be identified as such.

In FIG. 7, the finger detector 707 is shown as receiving an optional input from the object detector 702. The input from the object detector 702 may include e.g. an indication of the locations of the fingers relative to the objects detected in the obtained images. That is, the object detector 702 may be configured to detect the fingers and the objects in the obtained images and to provide an indication of this to the finger detector 707, which then determines whether a user is attempting to interact with the virtual button. In other examples, it may be that the finger detection is performed separately, using e.g. a separate camera secured to the front of an HMD.

By superimposing virtual buttons on top of a player's view of the non-luminous object, further granularity can be added to the controller.

Figure 8:
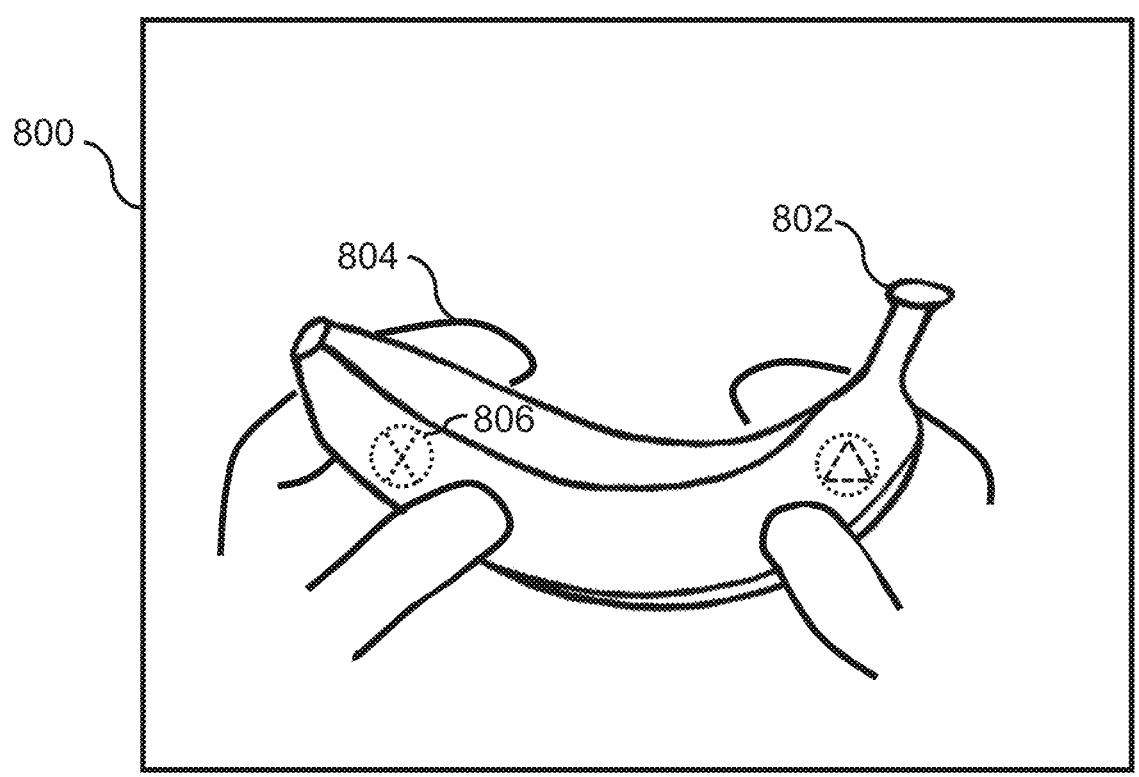
FIG. 8 shows schematically an example of an augmented reality banana controller.

FIG. 8 illustrates schematically an example of how the non-luminous object may appear to the user when one or more virtual buttons have been superimposed on top of the user's view 800 of the object. In FIG. 8, it can be seen that the banana 802, being held by the user 804, has two virtual buttons 806 displayed at locations correspond to the user's view of the front surface (relative to the viewer) of the banana. The image 800 shown in FIG. 8 may correspond to the image displayed at an HMD (either as a video image of the user) or as an image overlaid on top of a transparent display through which the user looks. Alternatively, image 800 may correspond to a video that is displayed at the same display device as the display being used to play the video game.

Figure 9:
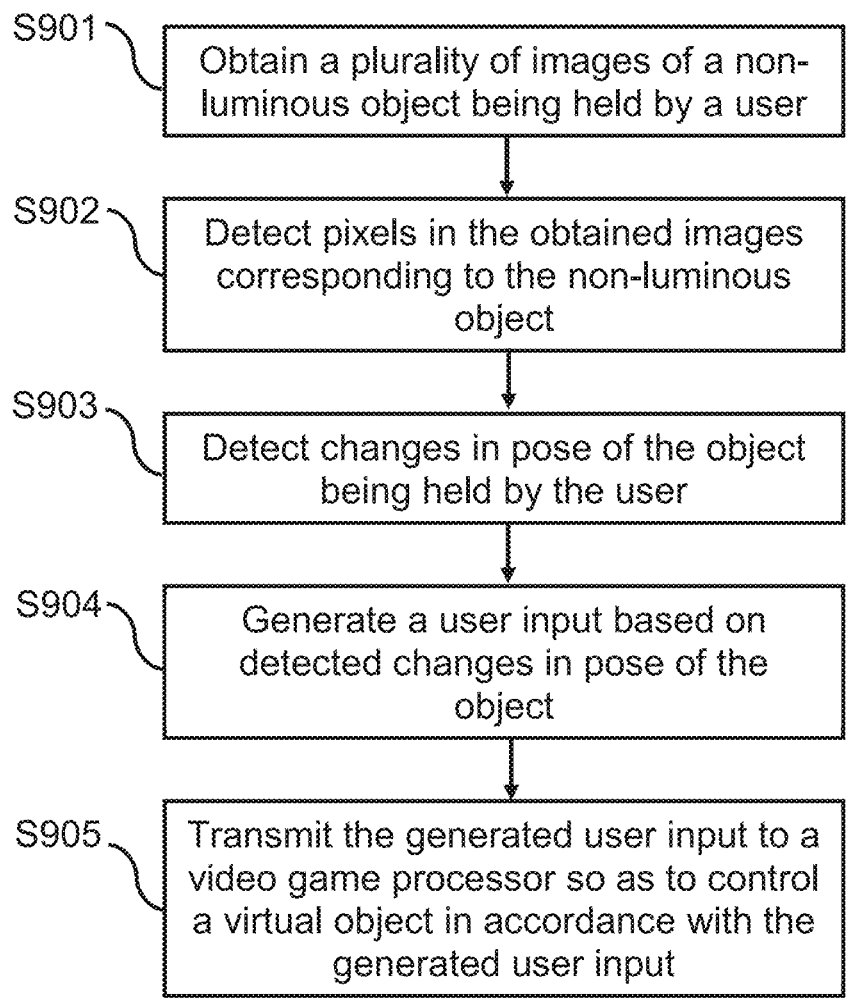
FIG. 9 shows schematically an example of a method for generate video game inputs in accordance with the present disclosure.

FIG. 9 shows schematically an example of a method for generating video game inputs in accordance with the present disclosure. The method corresponds to the steps performed by the system described previously. As above, it will be appreciated that the terms 'non-luminous object' and 'passive non-luminous object' are used interchangeably.

At a first step S901, a plurality of images of a non-luminous object being held by a user is obtained. The images may be obtained in any of the previously described manners. For example, the images may be received at e.g. a communication interface of a video game playing device or intermediate device, from an external camera via a wired or wireless connection. Alternatively, it may be that the camera is integral to, or attached to, the video game playing device (e.g. attached to an HMD) and so the images are received from such a camera. More generally, step S901 may comprise receiving the images at an input unit of a computing device, as described previously in relation to FIG. 7. The video images correspond to video images captured of the user in real or near-real time (which may have delays associated with propagation and processing), for controlling the operation of a video game playing device.

At a second step S902, pixels corresponding to the non-luminous object are detected in the obtained images. As before, this detection is based on the content of the image corresponding to the object being held and not based on a physical identifier (such as a QR code) that has been added to the object. As described previously, step S902 may involve detecting a plurality of non-luminous objects being held by the same or different users. In some examples, detecting pixels in the obtained images as corresponding to the non-luminous object comprises detecting a contour in the obtained images as corresponding to the non-luminous object being held by the user. In such examples, step S902 may comprise filtering one or more colours from the obtained images known not to correspond to the object being held by the user, prior to performing the contour detection. A binary mask may then be generated for each filtered image, and contour detection performed for each image. In such examples, the contour (or contours) detected as having a maximal area relative to the other contours in the obtained images may be identified as corresponding to the object being held by the user.

In some examples, step S902 may comprise detecting a plurality of contours in the obtained images and identifying a largest of the detected contours as corresponding to the non-luminous object being held by the use (as described previously in relation to FIGS. 2 to 6). As described previously, in some examples, a single user may be holding two objects (e.g. of the same type) in each hand. In such examples, step S902 may involve detecting at least two non-luminous objects being held by the user, with each object being detected based on one or more contours detected as corresponding to that object. A location within the image representation of each object may be identified based on the one or more contours detected for that object. If, for example, a single contour is detected for an object, then the location may correspond to a central point or location. If, for example, two contours are detected for a given object, the location may be determined as location located between the detected contours or e.g. in a larger of the two contours.

In alternative or additional examples, step S902 may comprise inputting the obtained images to a machine learning model that has been trained to identify 'every day' inanimate items in images.

At a third step S903, changes in pose of the non-luminous object are detected based on the image content of the obtained images. The change in pose of the passive non-luminous object may be based on at least one of a (i) contour detection operation and (ii) the output of a machine learning model that has been trained to detect the poses of objects in 2D images of such objects.

As described previously, step S903 may involve detecting changes in at least one of the (i) position, (ii) orientation and (iii) area of the contour (relative to corresponding default positions, orientations and areas). In examples where a single user is detected as holding two objects (e.g. one in each hand), the poses of the object may be determined as described previously. For example, step S903 may involve detecting a central point or region for each object, and detecting changes in position and orientation of the two objects based on how the position (or length) and orientation of a line connecting the two centre points changes (see FIGS. 5 and 6).

In examples where machine learning is used, it may be that detecting the pose (step S903) comprises performing 6D pose estimation, as described previously. That is, the obtained images of the user holding the object(s) may be input to a machine learning model that has been trained to perform six-dimensional pose estimation.

In examples where a user is detected as holing two non-luminous objects, one in each respective hand, step S903 may involve detecting a change in pose of the at least two non-luminous objects based on changes in orientation of a line intersecting the location detected for each object. The manners in which this may be done were described previously in relation to FIGS. 5 and 6.

At a fourth step S904, a user input for controlling a virtual object in a video is generated based on the detected changes in pose of the non-luminous object. As described previously, this may involve generating different user inputs depending on whether the rotation, position (x-y) and/or depth (distance from the camera) of the object is detected as changing.

At a fifth step S905, the generated user input is transmitted to a video game processor so as to control the virtual object in the video game in accordance with the generated user input. In some examples, it may be that the user input is generated at a device that is separate from the video game playing device and is thus communicated to the video game playing device via a wired or wireless connection. In other examples, it may be that the user input is generated at the video game playing device itself and is thus communicated to the one or more processors (e.g. CPU) so as to cause the video game to be updated in accordance with the generated user input. Although not shown, it will be appreciated that the method may further comprise updating the display of a virtual environment in accordance with the user input generated in response to the detected changes in pose of the object being held by the user.

In some examples (not shown) the method may further comprise detecting at least two non-luminous objects being held by different respective users and associating each object to a respective user. This may involve detecting at least two users in the obtained images (using e.g. OpenPose) and determining a relative distance between each user and each object. In this way, it can be determined which object(s) each user is located closest to. Each user may then be associated with the object they are detected as being closest to. In response to having associated each object to a respective user, changes in pose of each object may be tracked separately, and corresponding user inputs generated for the users based on the changes in pose of their associated objects. Generally, users are expected hold the object in front of them, and so associating each object with a corresponding user may involve detecting a given object as being located in front of a given user. As will be appreciated, in some examples, this may involve obtaining depth information such that a relative distance of each object from a given user can be estimated.

In some examples, computer software having computer executable instructions is provided, which, when executed by a computer cause the computer to perform any of the previously described method steps. This computer software may be stored at a non-transitory, machine-readable storage medium.

It will be appreciated that example embodiments can be implemented by computer software operating on a general-purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Embodiments of the present disclosure may be implemented according to any one (or more) of the following numbered clauses:

1. A system for generating video game inputs, the system comprising:
    an input unit operable to obtain images of a passive non-luminous object being held by a user;
    an object detector operable to detect the passive non-luminous object being held by the user in the obtained images;
    wherein the object detector is configured to detect an area in the image corresponding to the passive non-luminous object based on the pixels corresponding to the object and not based on a physical identifier that has been added to the object;
    an object pose detector operable to detect changes in pose of the passive non-luminous object based on the obtained images of the object;
    wherein the object pose detector is configured to detect the pose of the passive non-luminous object based on at least one of (i) a contour detection operation and (ii) the output of a machine learning model that has been trained to detect the poses of passive non-luminous objects in images; and
    a user input generator operable to generate a user input based on detected changes in the pose of the passive non-luminous object, and to transmit an indication of the generated user input to a video game unit executing an instance of a video game, so as to update the display of a virtual object in the video game in accordance with the generated user input.

2. A system according to clause 1, wherein the object detector is configured to detect a contour in the obtained images corresponding to a periphery of the passive non-luminous object that is being held by the user; and
   wherein the object pose detector is configured to detect changes in pose of the passive non-luminous object based on changes in least one of the orientation, position and area of the contour in the obtained images.

3. A system according to clause 2, wherein the user input generator is configured to generate different respective user inputs based on whether the orientation, position and area of the contour is detected as changing in the obtained images.

4. A system according to clause 2 or clause 3, wherein the object detector is configured to detect a plurality of contours in the obtained images, and to identify the largest contour as corresponding to the passive non-luminous object being held by the user.

5. A system according to any of clauses 2 to 4, wherein the object detector is configured to obtain colour information indicating a pre-determined colour of the passive non-luminous object that a user is or intends to hold; and
   wherein the object detector is configured to filter one or more colours not corresponding to the pre-determined colour from the obtained images, prior to performing the contour detection.

6. A system according to any preceding clause, wherein the input unit is configured to obtain images of at least two passive non-luminous objects being held by a user;
   wherein the object detector is configured to detect respective contours corresponding to the at least two passive non-luminous objects in the obtained images, and determine a respective location within the image representation of each object;
   wherein the object pose detector is configured to detect a change in pose of the at least two passive non-luminous objects based on changes in orientation of a line joining the detected locations; and
   wherein the user input generator is operable to generate a directional user input so as to control a direction in which the virtual object is travelling in the video game, and to transmit the generated user input to the video game unit.

7. A system according to clause 6, wherein object detector is configured to determine a respective location within the image representations of each object by calculating an image moment for the pixels within the contours detected for each non-luminous object so as to determine a point or region that is representative of the centre of each object.

8. A system according to clause 6 or clause 7, wherein the object detector is configured to detect at least two contours associated with each passive non-luminous object being held by the user;
   wherein the object detector is configured to generate a linear representation of each object based on the contours associated with that object; and
   wherein the object pose detector is configured to detect a change in pose of the at least two non-luminous objects based on changes in orientation of a line intersecting the linear representations generated for each object.

9. A system according to any of clauses 6 to 8, wherein the object pose detector is configured to detect whether the distance between the locations detected for each object is less than a threshold distance; and
   wherein the user input generator is configured to generate a user input corresponding to a change in control mode in response to receiving an input from the object pose detector indicating that the distance between the locations detected for each object is less than the threshold distance.

10. A system according to any preceding clause, wherein the object detector comprises a cascade classifier trained with images of passive non-luminous objects.

11. A system according to any preceding clause, wherein the object pose detector comprises a machine learning model trained to perform six-dimensional pose estimation for each passive non-luminous object detected being held by the user in the obtained images.

12. A system according to clause 11, wherein the obtained images comprise at least two passive non-luminous objects being held by a user;
   wherein the object pose detector is configured to detect a plurality of keypoints for each passive non-luminous object being held by the user; and
   wherein the user input generator is configured to generate a user input based on a detection of the distance between at least some of the keypoints for each object being detected as greater or less than a threshold distance.

13. A system according to clause 11 or clause 12, wherein the obtained images comprise at least two passive non-luminous objects being held by different respective users;
   the system further comprising a user identification unit operable to associate each passive non-luminous object with a different respective user based on at least one of a relative distance and depth between the passive non-luminous objects exceeding a threshold value; and
   wherein the user input generator is configured to generate user inputs for each user participating in a video game session based on the changes in pose detected of the corresponding passive non-luminous objects.

14. A system according to any of clauses 11 to 13, wherein the user input generator is configured to generate a different respective user input for each change in pose in a respective dimension.

15. A system according to any preceding clause, further comprising:
   an image generator operable to generate an image of a virtual button for superimposing on top of a user's view of the passive non-luminous object;
   a display for displaying the image of the virtual button at a location that corresponds to a location on the surface of the passive non-luminous object;
   a finger detector operable to detect a user's finger in the obtained images and a location of the finger relative to the passive non-luminous object;
   wherein the finger detector is configured detect when a user's finger coincides with the location of the virtual button, and in response to determining that the user's finger coincides with the location of the virtual button, provide an input to the user input generator; and
   wherein the user input generator is configured to generate a user input in accordance with a pressing of the virtual button.

16. A system according to any preceding clause comprising a camera operable to capture images of the non-luminous object being held by the user; and
   wherein the input unit is operable to receive the images of object captured by the camera.

17. A system according to any preceding clause, comprising the video game unit operable to receive the input from the user input generator.

18. A method for generating user inputs for a video game, the method comprising;

obtaining a plurality of images of a passive non-luminous object being held by a user;

detecting pixels in the obtained images as corresponding to the passive non-luminous object, the pixels corresponding to the object itself and not a physical identifier that has been added to the object;

detecting changes in pose of the passive non-luminous object based on the obtained images of the object;

wherein detecting the pose of the passive non-luminous object is based on at least one of a (i) contour detection operation and (ii) the output of a machine learning model that has been trained to detect the poses of objects in images;

generating, based on the detected changes in pose of the passive non-luminous object, a user input for controlling a virtual object in a video game; and transmitting the generated user input to a video game processor so as to control the virtual object in a video game in accordance with the generated user input.

19. A method according to clause 18, wherein detecting pixels in the obtained images as corresponding to the passive non-luminous object comprises detecting a contour in obtained images as corresponding to the passive non-luminous object being held by the user; and wherein detected changes in pose of the passive non-luminous object comprises detecting changes in at least one of the orientation, position and area of the contour in the obtained images.

20. A method according to clause 19, wherein detecting pixels in the obtained images as corresponding to the passive non-luminous object comprises detecting a plurality of contours in the obtained images and identifying the largest contour as corresponding to the passive non-luminous object being held by the user.

21. A method according to clause 19 or clause 20, comprising filtering one or more pre-determined colours from the obtained images prior to detecting a contour for the passive non-luminous object being held by the user.

22. A method according to any of clauses 19 to 21, comprising detecting at least two passive non-luminous objects being held by the user, each passive non-luminous object being detected based on one or more contours detected as corresponding to that object;

identifying a location within the image representation of each object based on the one or more contours detected for that object; and detecting a change in pose of the at least two passive non-luminous object based on changes in orientation of a line intersecting the detected locations, and generating a directional user input based on changes in orientation of the line intersecting the locations relative to a default orientation of said line with respect to the detected locations.

23. A method according to any of clauses 18 to 22, wherein estimating the pose comprises inputting the obtained images to a machine learning model trained to perform six-dimensional pose estimation.

24. A method according to any of clauses 18 to 23, comprising detecting at least two passive non-luminous objects in the obtained images, the method further comprising:

detecting at least two users in the obtained images;

determining a relative distance between each user and each object;

associating each object with a different respective user based on the distance between each object and the respective users; and generating user inputs for each user based on the detected changes in pose of the object associated to that user.

25. Computer software having computer executable instructions which, when executed by a computer cause the computer to perform the method of any of clauses 18 to 24.

26. A non-transitory, machine-readable storage medium which stores computer software according to clause 25.

The invention claimed is:

1. A system for generating video game inputs, the system comprising:

an input unit operable to obtain images of a passive non-luminous object being held by a user;

an object detector operable to detect the passive non-luminous object being held by the user in the obtained images;

wherein the object detector is configured to detect an area in the image corresponding to the passive non-luminous object based on the pixels corresponding to the object and not based on a physical identifier that has been added to the object;

an object pose detector operable to detect changes in pose of the passive non-luminous object based on the obtained images of the object;

wherein the object pose detector is configured to detect the pose of the passive non-luminous object based on at least one of (i) a contour detection operation and (ii) the output of a machine learning model that has been trained to detect the poses of passive non-luminous objects in images; and a user input generator operable to generate a user input based on detected changes in the pose of the passive non-luminous object, and to transmit an indication of the generated user input to a video game unit executing an instance of a video game, so as to update the display of a virtual object in the video game in accordance with the generated user input, wherein the input unit is configured to obtain images of at least two passive non-luminous objects being held by a user;

wherein the object detector is configured to detect respective contours corresponding to the at least two passive non-luminous objects in the obtained images, and determine a respective location within the image representation of each object;

wherein the object pose detector is configured to detect a change in pose of the at least two passive non-luminous objects based on changes in orientation of a line joining the detected locations; and wherein the user input generator is operable to generate a directional user input so as to control a direction in which the virtual object is travelling in the video game, and to transmit the generated user input to the video game unit.

2. The system of claim 1, wherein the object detector is configured to detect a contour in the obtained images corresponding to a periphery of the passive non-luminous object that is being held by the user; and wherein the object pose detector is configured to detect changes in pose of the passive non-luminous object based on changes in least one of the orientation, position and area of the contour in the obtained images.

3. The system of claim 2, wherein the user input generator is configured to generate different respective user inputs based on whether the orientation, position and area of the contour is detected as changing in the obtained images.

4. The system of claim 2, wherein the object detector is configured to detect a plurality of contours in the obtained images, and to identify the largest contour as corresponding to the passive non-luminous object being held by the user.

5. The system of claim 2, wherein the object detector is configured to obtain colour information indicating a pre-determined colour of the passive non-luminous object that a user is or intends to hold; and
    wherein the object detector is configured to filter one or more colours not corresponding to the pre-determined colour from the obtained images, prior to performing the contour detection.

6. The system of claim 1, wherein object detector is configured to determine a respective location within the image representations of each object by calculating an image moment for the pixels within the contours detected for each non-luminous object so as to determine a point or region that is representative of the centre of each object.

7. The system of claim 1, wherein the object detector is configured to detect at least two contours associated with each passive non-luminous object being held by the user;
    wherein the object detector is configured to generate a linear representation of each object based on the contours associated with that object; and
    wherein the object pose detector is configured to detect a change in pose of the at least two non-luminous objects based on changes in orientation of a line intersecting the linear representations generated for each object.

8. The system of claim 1, wherein the object pose detector is configured to detect whether the distance between the locations detected for each object is less than a threshold distance; and
    wherein the user input generator is configured to generate a user input corresponding to a change in control mode in response to receiving an input from the object pose detector indicating that the distance between the locations detected for each object is less than the threshold distance.

9. The system of claim 1, wherein the object detector comprises a cascade classifier trained with images of passive non-luminous objects.

10. The system of claim 1, wherein the object pose detector comprises a machine learning model trained to perform six-dimensional pose estimation for each passive non-luminous object detected being held by the user in the obtained images.

11. The system of claim 10, wherein the obtained images comprise at least two passive non-luminous objects being held by a user;
    wherein the object pose detector is configured to detect a plurality of keypoints for each passive non-luminous object being held by the user; and
    wherein the user input generator is configured to generate a user input based on a detection of the distance between at least some of the keypoints for each object being detected as greater or less than a threshold distance.

12. The system of claim 10, wherein the obtained images comprise at least two passive non-luminous objects being held by different respective users;
    the system further comprising a user identification unit operable to associate each passive non-luminous object with a different respective user based on at least one of a relative distance and depth between the passive non-luminous objects exceeding a threshold value; and
    wherein the user input generator is configured to generate user inputs for each user participating in a video game session based on the changes in pose detected of the corresponding passive non-luminous objects.

13. The system of claim 10, wherein the user input generator is configured to generate a different respective user input for each change in pose in a respective dimension.

14. The system of claim 1, further comprising:
    an image generator operable to generate an image of a virtual button for superimposing on top of a user's view of the passive non-luminous object;
    a display for displaying the image of the virtual button at a location that corresponds to a location on the surface of the passive non-luminous object;
    a finger detector operable to detect a user's finger in the obtained images and a location of the finger relative to the passive non-luminous object;
    wherein the finger detector is configured detect when a user's finger coincides with the location of the virtual button, and in response to determining that the user's finger coincides with the location of the virtual button, provide an input to the user input generator; and
    wherein the user input generator is configured to generate a user input in accordance with a pressing of the virtual button.

15. The system of claim 1, comprising a camera operable to capture images of the non-luminous object being held by the user; and
    wherein the input unit is operable to receive the images of object captured by the camera.

16. The system of claim 1, comprising the video game unit operable to receive the input from the user input generator.

17. A method for generating user inputs for a video game, the method comprising;
    obtaining a plurality of images of a passive non-luminous object being held by a user;
    detecting pixels in the obtained images as corresponding to the passive non-luminous object, the pixels corresponding to the object itself and not a physical identifier that has been added to the object;
    detecting changes in pose of the passive non-luminous object based on the obtained images of the object;
    wherein detecting the pose of the passive non-luminous object is based on at least one of a (i) contour detection operation and (ii) the output of a machine learning model that has been trained to detect the poses of objects in images;
    generating, based on the detected changes in pose of the passive non-luminous object, a user input for controlling a virtual object in a video game; and
    transmitting the generated user input to a video game processor so as to control the virtual object in a video game in accordance with the generated user input,
    wherein the obtaining includes obtaining images of at least two passive non-luminous objects being held by a user;
    wherein the detecting pixels includes detecting respective contours corresponding to the at least two passive non-luminous objects in the obtained images, and determining a respective location within the image representation of each object;
    wherein the detecting changes in pose includes detecting a change in pose of the at least two passive non-luminous objects based on changes in orientation of a line joining the detected locations; and
    wherein the generating includes generating a directional user input so as to control a direction in which the virtual object is travelling in the video game, and to transmit the generated user input to a video game unit.

18. A non-transitory machine-readable storage medium which stores computer software which, when executed by a computer, causes the computer to perform a method for generating user inputs for a video game, the method comprising;
- obtaining a plurality of images of a passive non-luminous object being held by a user;
- detecting pixels in the obtained images as corresponding to the passive non-luminous object, the pixels corresponding to the object itself and not a physical identifier that has been added to the object;
- detecting changes in pose of the passive non-luminous object based on the obtained images of the object;
- wherein detecting the pose of the passive non-luminous object is based on at least one of a (i) contour detection operation and (ii) the output of a machine learning model that has been trained to detect the poses of objects in images;
- generating, based on the detected changes in pose of the passive non-luminous object, a user input for controlling a virtual object in a video game; and
- transmitting the generated user input to a video game processor so as to control the virtual object in a video game in accordance with the generated user input,
- wherein the obtaining includes obtaining images of at least two passive non-luminous objects being held by a user;
- wherein the detecting pixels includes detecting respective contours corresponding to the at least two passive non-luminous objects in the obtained images, and determining a respective location within the image representation of each object;
- wherein the detecting changes in pose includes detecting a change in pose of the at least two passive non-luminous objects based on changes in orientation of a line joining the detected locations; and
- wherein the generating includes generating a directional user input so as to control a direction in which the virtual object is travelling in the video game, and to transmit the generated user input to a video game unit.

* * * * *